United States Patent [19]
Brown et al.

[11] 4,113,151
[45] Sep. 12, 1978

[54] DISPENSING GUN

[75] Inventors: Robert M. Brown, Kalamazoo; Rudolf R. Karliner, Portage, both of Mich.

[73] Assignee: Valley Hydro-Luft, Inc., Kalamazoo, Mich.

[21] Appl. No.: 723,465

[22] Filed: Sep. 15, 1976

Related U.S. Application Data

[63] Continuation-in-part of Ser. No. 631,317, Nov. 12, 1975, abandoned.

[51] Int. Cl.² ............................................. G01F 11/00
[52] U.S. Cl. .................................. 222/324; 222/327; 222/334; 222/386.5; 222/389
[58] Field of Search ................................. 222/323–324, 222/326–327, 334, 386.5, 389, 183

[56] References Cited

U.S. PATENT DOCUMENTS

| | | | |
|---|---|---|---|
| 1,471,091 | 10/1923 | Bessesen | 222/389 X |
| 2,446,501 | 8/1948 | Weber | 222/389 |
| 2,717,107 | 9/1955 | Moletz, Jr. et al. | 222/389 X |
| 3,109,463 | 11/1963 | Clemens | 222/386.5 X |
| 3,136,456 | 6/1964 | Sherbondy | 222/389 X |
| 3,141,584 | 7/1964 | Wing | 222/386.5 X |
| 3,712,516 | 1/1973 | Stamets et al. | 222/326 |
| 3,813,012 | 5/1974 | Laird | 222/389 X |
| 3,880,331 | 4/1975 | Perkins | 222/327 |

Primary Examiner—Robert B. Reeves
Assistant Examiner—Charles A. Marmor
Attorney, Agent, or Firm—Blanchard, Flynn, Thiel, Boutell & Tanis

[57] ABSTRACT

A fluid operated dispensing gun for dispensing viscous material in a disposable cylindrical cartridge. The dispensing gun has a hand grip and a barrel releasably secured to the hand grip. The cartridge containing the viscous material is positioned inside the barrel of the gun and a piston-like rear wall is advanced toward the open front end of the cartridge by pressurized fluid introduced into the rear end of the barrel on the rear side of the piston-like rear wall. Fluid passageways are provided in the hand grip for providing fluid communication from a source to the rear end of the barrel. A pair of manually operated valves are provided, one valve being provided for opening and closing the fluid passageway to the rear end of the barrel and the other valve being provided for controlling the rate of flow of the fluid entering the rear end of the barrel to thereby control the rate at which the viscous material is ejected from the cartridge. An inflatable bladder is provided at the rear end of the barrel and is adapted to inflate into the cartridge in response to the introduction of pressurized fluid at the rear end of the barrel to urge the piston-like rear wall toward the outlet of the cartridge and, consequently, urge the viscous material out of the cartridge through the outlet. A bleeder hole is provided in the hand grip and cooperates with the flow rate controlling valve to bleed the air trapped in the inflatable bladder during installation of the cartridge and inflatable bladder to the dispensing gun and when the pressurized fluid is a liquid.

13 Claims, 9 Drawing Figures

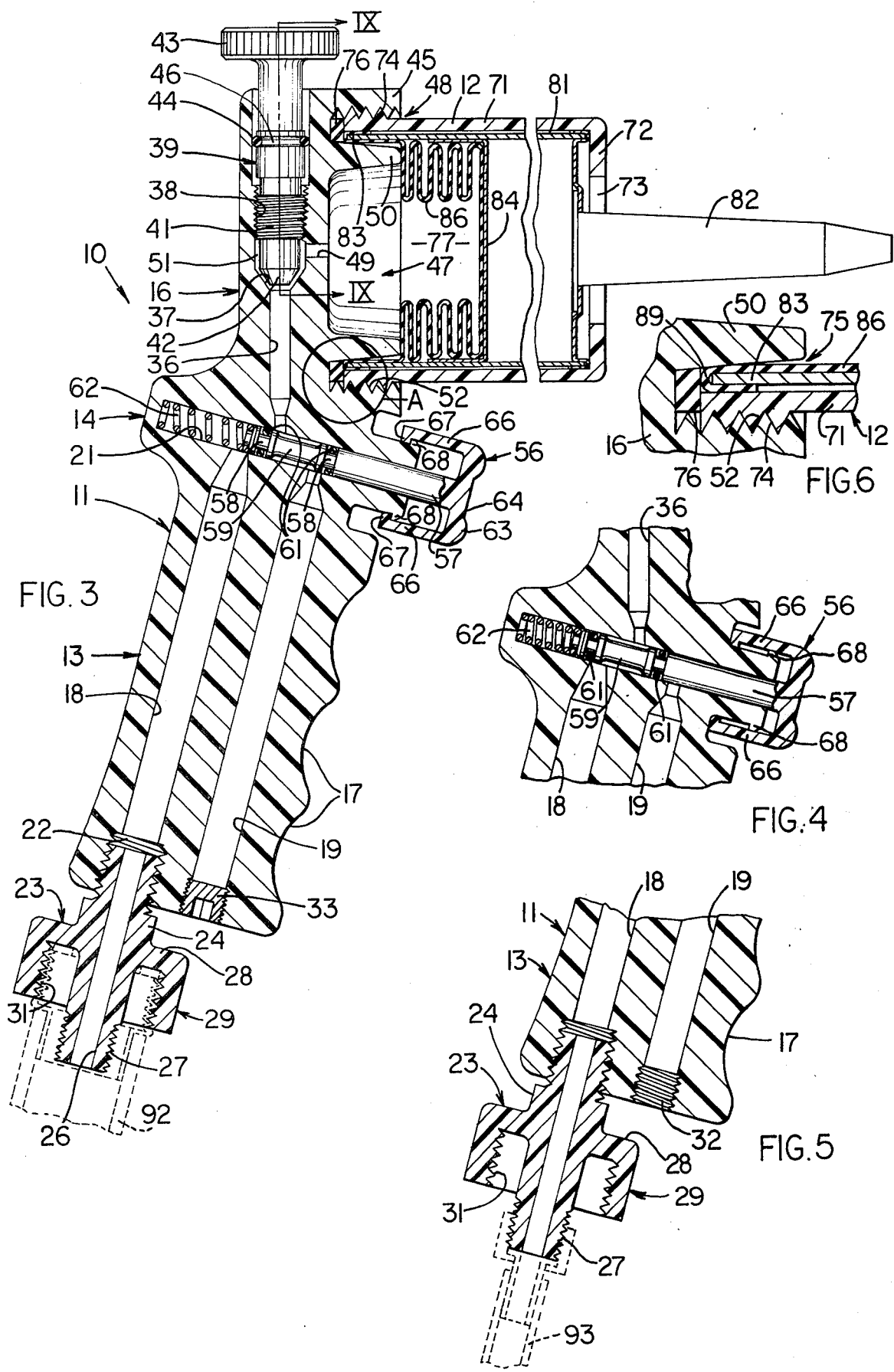

DISPENSING GUN

CROSS REFERENCE TO RELATED APPLICATION

This is a continuation-in-part application of application Ser. No. 631,317, filed Nov. 12, 1975, now abandoned.

FIELD OF THE INVENTION

This invention relates to a dispensing gun and, more particularly, to a fluid operated dispensing gun operable both by the pressure of a gas or the pressure of a liquid.

BACKGROUND OF THE INVENTION

Dispensing gun devices which eject a viscous material from a disposable cylindrical cartridge in response to a pressurized fluid are known in the art. Stamets et al U.S. Pat. No. 3,712,516, Collar U.S. Pat. No. 3,237,814 and Detrie et al Pat. No. 2,838,210 illustrate three such devices known in the prior art. The devices in the above-mentioned Collar and Detrie et al patents are operable in response to pressurized air being introduced into a chamber behind the piston-like rear wall of the cartridge. The Stamets et al patent is operable only in response to pressurized water. It is our desire to make a dispensing gun capable of dispensing a viscous material in response to the introduction of a pressurized fluid to the rear side of the piston-like rear wall of the cartridge more convenient to usage with any available pressurized fluid, be it a source of pressurized gas or a source of pressurized liquid.

Accordingly, the objects of this invention include:

1. To provide a fluid operated dispensing gun for dispensing a viscous material from a disposable cylindrical cartridge in response to either pressurized air or pressurized liquid being introduced to the rear side of the piston-like rear wall of the disposable cartridge;

2. To provide separate manually operated valves for (a) turning the flow of fluid to the rear side of the piston-like rear wall of the disposable cartridge on or off and (b) controlling the rate of flow of the pressurized fluid to the rear side of the piston-like rear wall of the disposable cartridge;

3. To provide an inflatable bladder member mountable in the rear end of the barrel and being adapted to inflate into the interior of the disposable cartridge on the rear side of the piston-like rear wall to urge the piston-like rear wall toward the outlet of the cartridge to thereby urge viscous material out through the cartridge outlet, the inflatable member functioning to prevent the pressurized fluid from leaking around the periphery of the piston-like rear wall of the disposable cartridge and becoming mixed with the viscous material;

4. To provide a fluid operated dispensing gun, as aforesaid, which can be used by connecting same to a convenient garden hose connected to a conventional water supply system in a home; and 5. To provide a fluid operated dispensing gun, as aforesaid, which can be used by connecting same to a convenient source of pressurized air.

SUMMARY OF THE INVENTION

In general, the objects and purposes of the invention are met by providing a fluid operated dispensing gun for dispensing a viscous liquid, the gun having means defining a hand grip and a barrel releasably secured to the hand grip. A disposable cylindrical cartridge containing the viscous material and formed with an outlet for the viscous material has a rear cylindrical rim and is equipped with a piston-like rear wall. The cartridge is positioned inside the barrel of the gun for advance of the piston-like rear wall by pressurized fluid introduced into the rear end of the barrel on the rear side of the piston-like rear wall. First passageway means is provided in the hand grip for providing a fluid passageway to the rear end of the barrel. First manually operated valve means are provided on the hand grip for opening and closing the fluid passageway means. Second manually operated flow control valve means are provided on the hand grip between the first manually operated valve and the rear end of the barrel and being independent of the first manually operated valve means for controlling the rate of flow of the fluid entering the rear end of the barrel to thereby control the rate at which the viscous material is ejected from the outlet on the cartridge. In addition, a bleeder hole is provided in the hand grip and is cooperable with the second valve means to bleed air from the fluid passageway and rear end of the barrel trapped therein during assembly of the cartridge to the dispensing gun and when the fluid is a liquid. An inflatable bladder is provided in the rear end of the barrel on the rear side of the piston-like rear wall and is adapted to inflate into the cartridge in response to fluid pressure to thereby urge the piston-like rear wall toward the outlet in the cartridge to thereby urge viscous material out of the cartridge through the outlet.

Further objects and purposes of this invention will be apparent to persons acquainted with apparatus of this general type upon reading the following specification and inspecting the accompanying drawings.

BRIEF DESCRIPTION OF THE DRAWINGS

FIG. 3 is a sectional view taken along the line III—III of FIG. 2, the showing being for a use with pressurized liquid;

FIG. 4 is a fragmentary sectional view of the finger operated valve portion illustrated in FIG. 3 but in the open position providing fluid communication to the rear end of the barrel of the gun;

FIG. 5 is a fragmentary sectional view of the lower end of the hand grip illustrated in FIG. 3 but with the plug in one of the passageways being removed therefrom to facilitate a use of the dispensing gun with pressurized air;

FIG. 6 is an enlarged fragmentary showing of the rear cylindrical rim of the disposable cartridge in the encircled portion "A" in FIG. 3;

Figure 1:
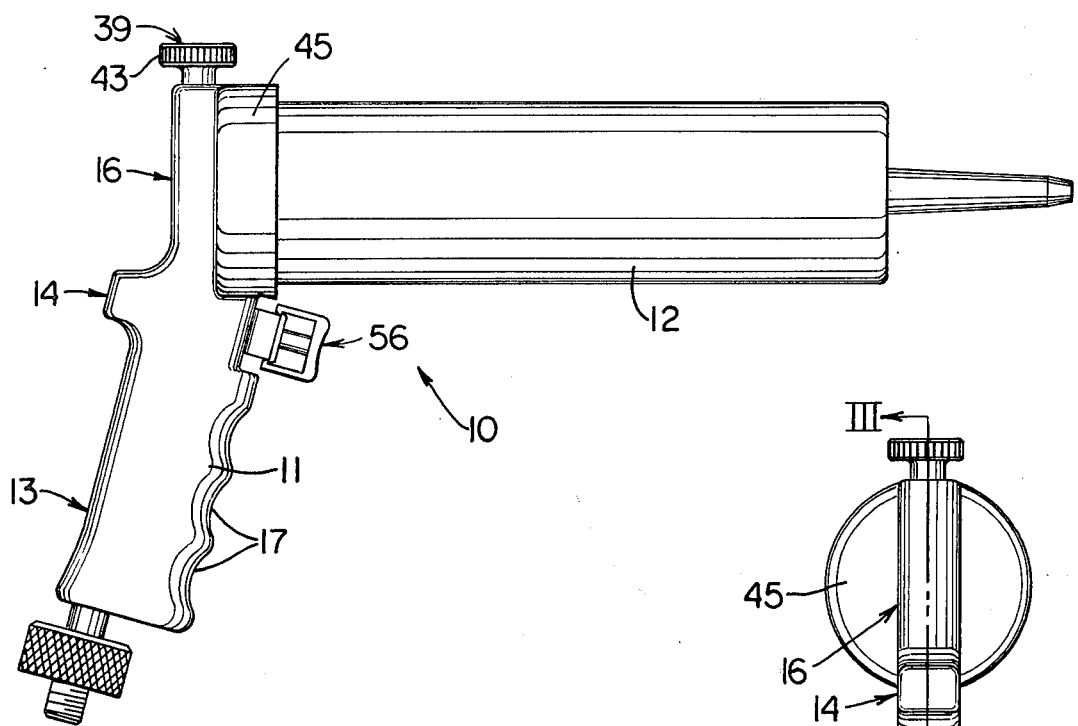
FIG. 1 is a side elevational view of the fluid operated dispensing gun embodying our invention.
Figure 2:
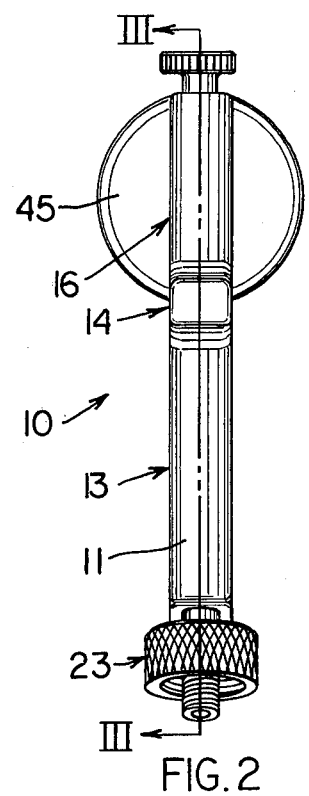
FIG. 2 is a left end view of the dispensing gun.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the devices and designated parts thereof. Such terminology will include the words above specifically mentioned, derivatives thereof and words of similar import.

DETAILED DESCRIPTION

The dispensing gun 10 embodying our invention is composed of a hand grip 11 and a barrel 12 releasably secured to the hand grip 11. The hand grip 11 is composed of a lower portion 13, an intermediate valve portion 14 and an upper portion 16. The lower portion 13 has a plurality of vertically spaced finger receiving recesses 17 on the external surface thereof thereby forming a grip for the hand of the user. A pair of passageways 18 and 19 extend generally vertically through the central part of the lower portion 13 and open outwardly downwardly at the bottom of the hand grip 11 and open upwardly into an elongated chamber 21 in the valve portion 14 having a generally horizontal longitudinal axis. The longitudinal axes of the passageways 18 and 19 are generally perpendicular to the longitudinal axis of the chamber 21. The lower end of the passageway 18 is provided with an internal thread 22 which has threadedly engaged therewith a connector 23. The connector 23 has an elongated shaft portion 24 having a central passageway 26 through the center thereof communicating with the passageway 18. One end of the shaft portion 24 has an external thread thereon engaging the internal threads 22 on the hand grip 11 to provide the aforesaid connection. The opposite end of the shaft portion 24 has external threads 27 thereon. A flange 28 extends radially outwardly of the shaft portion 24. An annular flange 29 extends in a direction parallel to the longitudinal axis of the shaft portion 24 and from the radially outer edge of the flange 28 to encircle the shaft portion 24. The flange 29 has internal threads 31 on the internal surface thereof which is spaced radially outwardly from the external surface of the shaft portion 24.

An internal thread 32 is provided at the lower end of the passageway 19 (FIG. 5) and is adapted to receive an externally threaded plug 33 therein (FIG. 3). The purpose of the plug 33 will be explained below.

Figure 9:
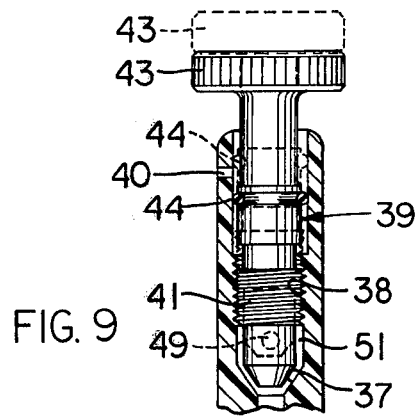
FIG. 9 is a sectional view taken along the line IX—IX of FIG. 3.

A passageway 36 communicates with and extends upwardly from the chamber 21 in the upper portion 16 of the hand grip 11. The passageway 36 opens outwardly at the top of the hand grip 11. The location of the entry point of the passageway 36 into the chamber 21 is intermediate the locations where the passageways 18 and 19 open into the chamber 21. A valve seat 37 is provided in the passageway 36 and is inclined upwardly toward the open upper end of the passageway. An internal thread 38 is also provided in the passageway 36 above the valve seat 37. A bleeder hole 40 (FIG. 9) is provided in the wall of the passageway 36 above the internal thread 38. A valve member 39 is received into the upper end of the passageway 36 above the valve seat 37. The valve member 39 has an external thread 41 thereon threadedly engaging the thread 38 in the passageway 36. A valve surface 42 is provided on the lower end of the valve member 39 and is adapted to engage the valve seat 37 in response to a relative rotation between the valve member 39 and the hand grip 11. When the valve surface 42 engages the valve seat 37, no flow of fluid will be permitted therepast. A spacing between the valve surface and the valve seat serves to regulate the rate of flow of fluid to a chamber 77 described below. A knob 43 is provided on the upper end of the valve member 39 to facilitate a manual gripping thereof and rotation of the valve member relative to the hand grip 11. A conventional O-ring seal 44 is provided in an O-ring groove 46 on the valve member 39 above the threads 38, 41 to prevent leakage of the pressurized fluid past the valve member out through the open upper end of the passageway 36. The bleeder hole 40 is positioned substantially above the location of the O-ring seal 44 when the valve surface 42 either engages the valve seat 37 or is opened to permit flow of fluid therepast.

The upper portion 16 of the hand grip 11 has an enlarged cylindrically-shaped body part 45 with a frontwardly opening recess 47 therein and a frontwardly opening annular recess 48 encircling the frontwardly opening recess 47. The radially outer wall 50 of the recess 47 defines the radially inner wall of the recess 48. Both recesses have axes which are coaxial and perpendicular to the longitudinal axis of the passageway 36. A passageway 49 is provided in the upper portion 16 and provides communication between a chamber 51 located between the internal thread 38 and the valve seat 37 in the passageway 36 and the frontwardly opening recess 47. The radially outer wall of the recess 48 has an internal thread 52 thereon.

A valve member 56, separate from the valve member 39, is reciprocally received in the chamber 21. The valve member 56 is comprised of an elongated rod 57 which is slidingly received in the chamber 21 and has a pair of spaced O-ring grooves 58 therein, intermediate of which is a portion of reduced diameter 59. The spacing between the O-ring grooves 58 is approximately equal to the spacing between the locations at which the passageways 18 and 19 open into the chamber 21. O-rings 61 are provided in each of the O-ring grooves 58 and serve to define a seal for preventing pressurized fluid from escaping axially from the portion of reduced diameter 59 along the periphery of the rod. A spring 62 urges the elongated rod 57 axially of the chamber 21, namely to the right in FIG. 3. An enlarged head 63 is provided on the rod 57 and has a finger engaging recess 64 thereon to facilitate a gripping of the enlarged head by a finger of the user. The enlarged head 63 has a pair of axially extending flanges 66 which have inwardly projecting tips 67 at their free ends engaging stops 68 on the upper portion to limit the rightward movement of the elongated rod 57. In other words, the spring 62 urges the rod rightwardly until the tips 67 engage the stops 68.

The spacing between the O-rings 61 will prevent at all times a communication between the passageways 18 and 19 when the rod 57 is moved to the left against the urging of the spring 62. Similarly, a movement of the rod 57 to the leftmost limit shown in FIG. 4 will cause the passageway 18 to become connected to the passageway 36 through the portion of reduced diameter 59. The passageway 19 is blocked and no communication is provided between the passageways 18, 36 and the passageway 19.

The barrel 12 is comprised of an elongated cylindrical body 71 having a partially closed end 72 with an opening 73 therethrough. The opposite end of the body 71 is completely open and has an external thread 74 thereon engaging the internal thread 52 on the hand grip 11. The radially inner surface of the body 71 is larger in diameter than the outer diameter of the intermediate wall 50 between the recesses 47 and 48 to define a gap 75 therebetween (FIG. 6). A sealing ring 76 is provided in the bottom of the annular recess 48 and is adapted to be compressed between the left end of the cylindrical body 71 and the upper portion 16 to thereby prevent leakage of pressurized fluid from a chamber 77 described below.

The internal diameter of the cylindrical body 71 is adapted to receive a disposable cylindrically-shaped cartridge 81 therein with the nozzle portion 82 thereof extending outwardly through the opening 73. The left end of the disposable cartridge 81 has a cylindrical rim structure 83 which is received into the gap 75 between the outer surface of the wall 50 and the internal surface of the cylindrical body 71 (see FIG. 6). A piston-like rear wall 84 is slidably disposed within the interior of the disposable cartridge 81, a rightward movement thereof effecting a discharge of viscous material from within the disposable cartridge 81 out through an opened nozzle 82. There is usually no effective seal between the piston-like rear wall 84 and the internal diameter surface of the cartridge 81. The chamber 77, mentioned above, is defined by the recess 47 in the upper portion 16 of the hand grip 11, the cylindrical body portion of the disposable cartridge 81 and the piston-like rear wall 84. Thus, the sealing ring 76 will prevent an escape of pressurized fluid from the fluid circuit including the chamber 77.

Figure 7:
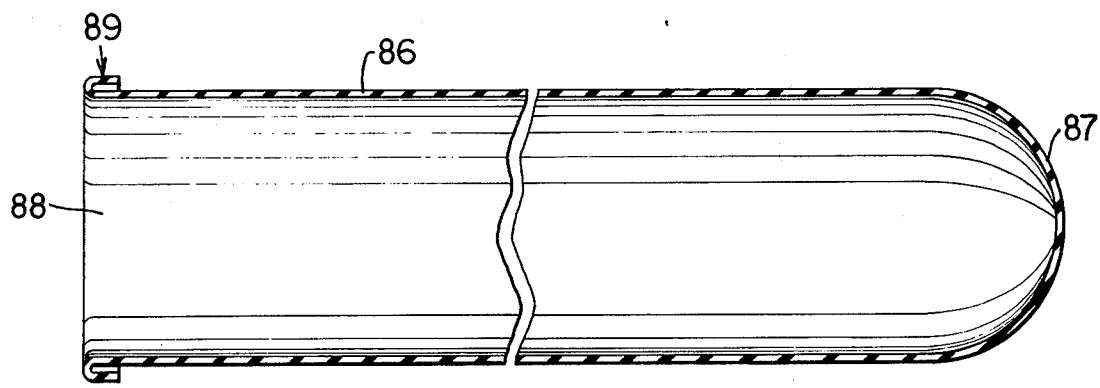
FIG. 7 is a central sectional view through an inflatable bladder.

If desired, an inflatable bladder 86 can be utilized within the chamber 77. More specifically, the inflatable bladder (FIG. 7) is composed of an elongated cylindrical portion 86 having a closed end 87 at one end thereof and an open end 88 at the other end. A curled-over rim structure 89 is provided around the open end 88 of the inflatable bladder 86. The curled rim 89 is adapted to fit over the cylindrical rim 83 at the left end of the disposable cartridge 81 as best illustrated in the fragmentary illustration of FIG. 6. It will be noted that the exterior surface of the intermediate wall 50 tapers so that the diameter thereof increases toward the bottom of the recess 48. As a result, when the disposable cartridge 81 is moved leftwardly, the internal surface of the inflatable bladder 86 engages the outer surface of the intermediate wall 50 and forms another seal to prevent pressurized fluid in the chamber 77 from escaping therefrom. Further, the inflatable bladder 86 also prevents pressurized fluid from escaping past the piston-like rear wall 84 in the disposable cartridge 81. As a result, pressurized fluid, be it air, water or some other substance, will not become mixed within the viscous material within the disposable cartridge 81 around the nonsealing fit between the piston-like rear wall 84 and the inner surface of the cartridge 81.

Figure 8:
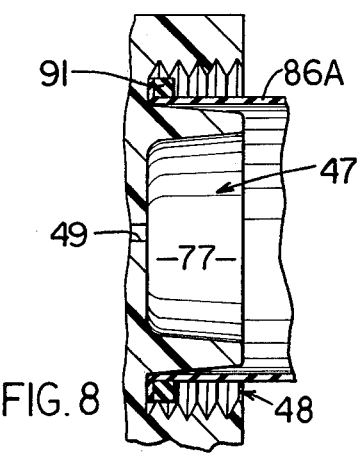
FIG. 8 is a modified form of the inflatable bladder, which modified form does not require a physical attachment to the rear rim structure of the disposable cartridge.

If desired, the inflatable bladder 86 can be modified as illustrated by the modified structure 86A illustrated in FIG. 8. The inflatable bladder 86A has a sealing ring 91 fixedly secured thereto. The structure is similar to securing the inflatable bladder 86 (FIG. 7) to the sealing ring 76 (FIGS. 3 and 6). In the embodiment illustrated in FIG. 8, the sealing ring 91 and the inflatable bladder 86 would form an integral part of the total dispensing gun package and would be sold therewith.

If the inflatable bladders 86 or 86A should become perforated, new inflatable bladders can be purchased for replacement within the unit.

The piston-like rear wall 84 of the disposable cartridge 81 is usually of an inexpensive construction and its coaxial alignment with the longitudinal axis of the cartridge 81 is subject to variance as the wall moves longitudinally of the cartridge. In some instances, the wall 84 will become tipped so that pressurized fluid will enter the viscous material inside the cartridge 81 from the expanding chamber 77. We have discovered that we can eliminate the problem of the tipping wall 84 by utilizing the aforedescribed bladders 86 and 86A in combination with the disposable cartridges. The bladders 86 and 86A will prevent the escape of pressurized fluid from the expanding chamber 77 through the rather poor seal between the periphery of the wall 84 and the internal surface of the cartridge 81. Thus, even if the wall 84 should become tipped, the bladders 86 and 86A will function to prevent a mixture of the pressurized fluid with the viscous material within the cartridge 81.

OPERATION

Although the operation of the device embodying the invention has been indicated somewhat above, said operation will be described in detail hereinbelow for convenience.

The first sequence of operation will be described assuming that the pressurized fluid is a liquid, such as water from a conventional household supply. In this instance, the plug 33 is secured in the passageway 19 in the hand grip 11 as illustrated in FIG. 3. A conventional garden hose 92 (broken lines in FIG. 3) is coupled to the internal threads 31 of the connector 23. The barrel 12 is removed from the hand grip 11. The faucet is then turned on. The degree at which the faucet is turned on makes no difference because our device is capable of compensating for the valve adjustment at the house. As a result, we can control our valve at distances remote from the house without having to return to the house to adjust the faucet. Next, the trigger-like valve member 56 is operated by moving the elongated rod 57 leftwardly to bring the passageway 18 into communication with the passageway 36. Water will then flow between the aforesaid passageway past the opening between the valve seat 37 and the valve surface 42 to the passageway 49. This procedure introduces water into the passageway system. Thereafter, the finger engagement with the trigger-like valve member 56 is released and the spring 62 will urge the elongated rod 57 to the right until the tips 67 engage the stops 68.

An inflatable bladder 86 is then placed into position on the cylindrical rim 83 at the left end of the disposable cartridge 81 and the curled rim 89 fitted over the cylindrical rim 83. Next, the disposable cartridge 81 is inserted into the elongated body 71 of the barrel 12 so that the nozzle 82 thereof projects out through the opening 73. Next, the elongated body 71 of the barrel 12 is held so that the longitudinal axes of the barrel and cartridge are vertically aligned. Water is filled into the open upper end of the bladder 86. Thereafter, the external threads 76 on the barrel 12 and the internal threads on the hand grip 11 are brought into alignment (while the barrel and cartridge are held in the vertically aligned position) and the barrel 12 rotated so that the barrel becomes releasably and threadedly secured to the hand grip 11. On the other hand, or in the alternative, the valve member 39 can be moved to the broken line position in FIG. 9 to place the O-ring 44 above the bleeder hole 40 to effect a release of air trapped in the passageway 36 and the chamber 77. The unit is now ready for operation.

The rate at which the viscous material is dispensed out through the nozzle 82 of the disposable cartridge 81 is regulated by the valve member 39, particularly the spacing between the valve surface 42 and the valve seat 37. Thus, it is possible, without using the trigger valve member 56, to control the rate of flow of the viscous material from the disposable cartridge 82.

It is to be recognized that the foregoing described steps for preparing the gun for operation is essentially the same as has been described above for the embodiment illustrated in FIG. 8. The only difference with the embodiment of FIG. 8 is that the inflatable bladder 86A and seal ring 91 merely rest on the left cylindrical rim 83 of the disposable cartridge. However, the elongated body 71 and cartridge 81 must still be vertically aligned to facilitate a filling of the inflatable bladder with water prior to the time that the barrel 12 is threadedly secured to the hand grip 11. This procedure eliminates the formation of an air bubble in the chamber 77. In addition, and with an appropriate adjustment of the valve member 39, the assembled gun 10 may be mounted so that the air in the chamber 77 will rise out through the passageway 49 and be urged out through the bleeder hole 40. This procedure also eliminates the need to fill the chamber 77 with liquid prior to assembly thereof in the gun.

Operation of the trigger-like valve 56 will, as aforesaid, introduce pressurized liquid into the chamber 77. A return of the elongated rod 57 to the rightmost position illustrated in FIG. 3 will connect the passageway 36 and chamber 77 to the passageway 19. Thus, and since the pressure in passageway 18 is no longer connected to the passageway 36, pressure to the chamber 77 will be instantly halted thereby stopping the dispensing of viscous material from the nozzle 82.

When the unit is utilized with air, the plug 33 is removed from the lower end of the passageway 19 as illustrated in FIG. 5. A conventional air hose 93 (broken lines in FIG. 5) is coupled to the external threads 27 on the connector 23. In this embodiment, it is not necessary to fill the bladder with a liquid. Instead, the disposable cartridge 81 can be placed into the body 71 of the barrel 12 in the manner described above with the inflatable bladder 86 or 86A in the proper location and the barrel 12 secured to the hand grip 11. Thereafter, a movement of the elongated rod 57 of the trigger-like valve 56 leftwardly against the urging of the spring 62 will bring the passageway 18 into communication with the passageway 36 through the portion of reduced diameter 59 on the rod 57. Air pressure will then be supplied to the chamber 77 to effect a rightward movement of the piston-like rear wall 84 in the disposable cartridge 81.

As stated above, the valve member 39 will regulate the rate of flow of viscous material from the disposable cartridge 81. The rate of flow is controlled by the spacing between the valve surface 42 and the valve seal 37. This control is regulated by the amount that the valve member 39 is rotated and this is controlled at a convenient location on the gun and no need is present for returning to the source of air pressure to regulate the amount of air pressure.

When the trigger-like valve 56 is released, the spring 62 will return the elongated rod 57 rightwardly until the tips 67 engage the stops 68 at which time the passageway 36 becomes connected to the passageway 19 through the portion of reduced diameter 59 on the rod 57. Since the plug 33 has been removed, the pressure in the chamber 77 will be exhausted out through the passageway 19 to the atmosphere. Thus, the flow of viscous material from the nozzle of the disposable cartridge will be halted.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a fluid operated dispensing gun for dispensing a viscous material, said gun having means defining a hand grip and means defining a barrel receiving portion on which a barrel is releasably secured and wherein a disposable cylindrical cartridge containing said viscous material and formed with an outlet for dispensing said viscous material therefrom has a rear cylindrical rim and is equipped with a piston-like rear wall, said viscous material being located between said piston-like rear wall and said outlet, said cartridge being positioned inside said barrel of said gun for advance of said piston-like rear wall of said cartridge toward said outlet by pressurized fluid introduced into the rear end of said barrel on the rear side of said piston-like rear wall, the improvement comprising:

fluid passageway means in said hand grip means and said barrel receiving portion for providing a fluid passageway to said rear end of said barrel;

first manually operated valve means on said hand grip means and in said fluid passageway means for opening and closing said fluid passageway means;

second manually operated flow rate control valve means on said barrel receiving portion and in said fluid passageway means between said first valve means and said rear end of said barrel and being independent of said first manually operated valve means for controlling the rate of flow of said fluid through said fluid passageway means and said rear end of said barrel to thereby control the rate at which said piston-like rear wall is advanced toward said outlet and the rate at which said viscous material is ejected from said outlet; and a bleeder hole in said barrel receiving portion providing fluid communication between said rear end of said barrel and the atmosphere, said fluid communication being controlled by said second manually operated valve means.

2. The improvement according to claim 1, wherein said hand grip means includes a hand grip; and wherein said barrel receiving portion has first coupling means thereon, said barrel having second coupling means thereon releasably cooperable with said first coupling means to thereby form said releasable securement of said barrel to said second portion.

3. The improvement according to claim 2, wherein said fluid passageway means includes a first passageway in said hand grip means extending from a first inlet at the bottom of said hand grip means to said first manually operated valve means, a second passageway extending in said barrel receiving portion from said first manually operated valve means to a second inlet to said rear end of said barrel, said first manually operated valve means opening and closing the communication between said first and second passageways in response to manual operations thereof, said fluid passageway means also including a third passageway extending from said first manually operated valve means through said hand grip means to an outlet to the atmosphere, said first manually operated valve means closing and opening the communication between said second and third passageways, said first manually operated valve means effecting an opening of said communication between said second and third passageways whenever said communication between said first and second passageways is closed and a closing of said communications between said second and third passageways whenever said communication between said first and second passageways is opened.

4. The improvement according to claim 3, wherein said pressurized fluid is air.

5. The improvement according to claim 3, wherein said first and third passageways are parallel and located in said hand grip.

6. The improvement according to claim 3, wherein said outlet from said third passageway has means thereon for closing said third passageway to the atmosphere; and wherein said pressurized fluid is a liquid.

7. The improvement according to claim 3, wherein said first inlet has connector means thereon for facilitating a connection to both an air hose and a water hose but one hose at a time.

8. The improvement according to claim 3, including inflatable bladder means mounted in said rear end of said barrel on said rear side of said piston-like rear wall, said inflatable bladder means sealingly engaging said rear cylindrical rim of said cartridge and a wall surface on said barrel receiving portion around said second inlet to prevent a leakage of pressurized fluid therepast so that all pressurized fluid in said second passageway is communicated to said rear end of said barrel when said first manually operated valve means is open between said first and second passageways and closed between said second and third passageways.

9. The improvement according to claim 1, including inflatable bladder means mounted in said rear end of said barrel on said rear side of said piston-like rear wall and adapted to inflate into said cartridge and the pressure therein urging said piston-like rear wall toward said outlet from said cartridge to thereby urge viscous material out of said cartridge through said outlet.

10. The improvement according to claim 1, including inflatable bladder means mounted in said rear end of said barrel on said rear side of said piston-like rear wall, wherein said inflatable bladder means consists of an elongated, resilient tube having a closed end, an open end remote from said closed end and sealing means for engaging an end of said disposable cartridge remote from said outlet, said sealing means engaging also said barrel and said barrel receiving portion to prevent leakage of said pressurized fluid from said rear side of said piston-like rear wall.

11. The improvement according to claim 10, wherein said sealing means is a curled rim encircling said open end of said inflatable bladder means.

12. The improvement according to claim 10, wherein said sealing means comprises a resilient ring fixedly secured to and encircling said open end of said inflatable bladder means.

13. The improvement according to claim 1, wherein said second manually operated flow rate control valve means includes means for selectively varying the cross-sectional area of said fluid passageway means to selectively and variably restrict the volume of fluid flowing therepast.

* * * * *